United States Patent [19]

Kostecki et al.

[11] Patent Number: 4,997,318
[45] Date of Patent: Mar. 5, 1991

[54] APPARATUS FOR CONTINUOUSLY CONVEYING A POWDER IN A GAS FLOW

[75] Inventors: Michael P. Kostecki, Weishaden; Frank Rader, Hattersheim/M, both of Fed. Rep. of Germany

[73] Assignee: The Perkin-Elmer Corporation, Norwalk, Conn.

[21] Appl. No.: 401,321

[22] Filed: Aug. 31, 1989

[30] Foreign Application Priority Data

Sep. 14, 1988 [DE] Fed. Rep. of Germany ....... 3831256

[51] Int. Cl.$^5$ .................... B65G 53/12; B65G 53/48; B65G 53/40
[52] U.S. Cl. ........................................ 406/66; 406/63; 406/67; 406/146; 406/122
[58] Field of Search ..................... 406/66, 67, 62-65, 406/68, 146, 122

[56] References Cited

U.S. PATENT DOCUMENTS 3,517,861  6/1970  Dela Vega.
4,381,898  5/1983  Rotolico et al. ................. 406/144 X
4,808,042  2/1989  Muehlberger et al. ............... 406/66

FOREIGN PATENT DOCUMENTS 1276488  10/1961  France ................................. 406/66
1416165  2/1972  United Kingdom .................. 406/63
1599846  4/1978  United Kingdom.

Primary Examiner—Joseph F. Peters, Jr.
Assistant Examiner—James M. Kannofsky
Attorney, Agent, or Firm—H. S. Ingham; E. T. Grimes

[57] ABSTRACT

An apparatus for continuously conveying a powder in a gas flow has a configuration of the bottom end of the supply reservoir in the form of a funnel-shaped guide surface converging towards a pointed end. This surface is intersected by a vertically extending cylindrical well defining a bottom area where the powder is received in perforations formed in a rotary disc for discharge from the well. The wall of the well is preferably provided with a fluidizing gas inlet.

8 Claims, 4 Drawing Sheets

APPARATUS FOR CONTINUOUSLY CONVEYING A POWDER IN A GAS FLOW

The present invention relates to an apparatus for continuously conveying a powder in a gas flow, comprising a reservoir for containing a powder, a rotatable disc mounted above the bottom of the reservoir and formed with perforations for receiving the powder from said reservoir therein, a gas supply passage and a gas-and-powder discharge passage, respective ends of said passages being disposed at opposite sides of said disc at a location remote from the bottom of the reservoir.

BACKGROUND OF THE INVENTION

In performing for instance a flame-spraying process or a plasma-spraying process for providing a substrate with a highly corrosion and wear-resistant surface, the powder to be sprayed has to be continuously fed to the spray nozzle in a gas flow at a predetermined rate per time unit. Apparatus for performing a process of this type is already known from U.S. Pat. No. 3,517,861, this apparatus comprising a cylindrical powder reservoir, and a disc mounted above the bottom of the reservoir at an excentrically offset position relative thereto, the disc being formed with one or more circular arrays of perforations for receiving the powder from the reservoir therein. As a result of the excentrically offset mounting of the disc, a part of its circumferential portion projects outwards of the reservoir. At this location outward of the reservoir, the powder entrained in the perforations of the disc is introduced into the gas flow. To this purpose, an end of a gas supply passage opens above the disc at this location in alignment with a gas-and-powder discharge passage disposed below the disc. Although this arrangement permits the powder discharge rate to be reasonably accurately adjusted and to be varied within a relatively wide range, this apparatus suffers from the serious disadvantage that it is difficult to achieve a continuous and steady powder discharge flow when only small amounts of a given powder are to be sprayed.

If the powder to be sprayed may not come into contact with air, the powder which has not been consumed when changing from one powder to another one has usually to be discarded, because it is inevitable that the powder comes into contact with air when emptying the reservoir.

Also known already from U.S. Pat. No. 4,381,898 is a powder reservoir provided with an interior powder guide surface of a conical shape converging towards a pointed end adjacent a powder discharge passage at a bottom location. In this arrangement the discharge of the powder is brought about by maintaining the interior of the powder reservoir at an elevated pressure higher than that of the gas flow into which the powder is to be introduced. This pressure difference is also used for controlling the powder discharge rate. For enabling an apparatus of this type to also dispense powders having insufficient flow characteristics, the sidewalls of the interior powder guide surface are provided with gas entry ports for fluidizing the powder at a level above the powder outlet in the bottom area of the reservoir. With an apparatus of this type it is likewise not possible to controlledly dispense minimal amounts of a powder for the coating of smaller surfaces. This is because in an apparatus of this type the discharge of the powder is already started as soon as the gas for fluidizing the powder is supplied to the reservoir. Depending on the type of the powder, a start-up period of about 20 to 60 seconds is then required before the powder is steadily discharged at the desired rate.

It is therefore an object of the present invention to provide an apparatus of the type defined in the introduction, which permits small amounts of a powder to be sprayed at a desired steady rate, and which eliminates the necessity of discarding any considerable amounts of the powder when changing from one type of powder to another one.

SUMMARY OF THE INVENTION

According to the invention this object and other objects are attained by the provision that within the reservoir there is provided a funnel-shaped powder guide surface converging towards a point adjacent said disc, and that there is provided a vertical, cylindrical well extending down to said disc and defining the bottom of the reservoir, said well intersecting said powder guide surface and contacting the pointed end of said funnel-shaped powder guide surface. These provisions result in an arrangement in which only a small surface area of the disc acts as the bottom of the reservoir at any time, this small surface area being always covered with a powder layer of sufficient thickness due to the configuration of the powder guide surface and the provision of the well. It is therefore not necessary to bodily tip the reservoir for ensuring that the perforations are correctly filled with the powder. Even after an interruption of the spraying process, the process can immediately be resumed with the correct powder discharge rate, the start-up period being practically negligible.

According to an advantageous embodiment the well extends laterally to a location adjacent the interior wall surface of the reservoir.

The well may in fact have any suitable cross-sectional shape, from a narrow and elongate configuration to an elliptical or circular shape to thereby define on the rotatable disc a bottom surface area of a corresponding shape.

In a particularly advantageous embodiment, a sidewall defining the well is formed with an inlet for a fluidizing gas. With an arrangement of this type it is possible to process powders having otherwise insufficient flow characteristics at a desirably steady rate. As a whole this embodiment offers the advantage that the powder can be maintained in a fluidized state even when the spraying process has to be interrupted for any reason. As a result, the spraying process using such a powder having insufficient flow characteristics may be immediately resumed after an interruption without requiring any particular start-up period.

The fluidizing gas inlet is preferably located at the side of the well sidewall facing away from the pointed end of the funnel-shaped guide surface. Another suitable location for the fluidizing gas inlet would be an offset position at right angles to the above. It is further preferred that the fluidizing gas inlet is positioned at a spaced location above the bottom of the powder reservoir, i.e. above the rotatable disc.

For achieving a particularly constant flow of the powder even in the case of a powder having insufficient flow characteristics, the fluidizing gas inlet may be formed as a slot extending along a part of the circumferential wall of the well.

In the fluidizing gas inlet there is preferably disposed a disc made of a sintered material and effective to discharge the gas into the powder reservoir in a diffuse flow pattern.

Preferred embodiments of the invention shall now be described in detail by way of example with reference to the accompanying drawings.

DETAILED DESCRIPTION OF THE INVENTION

Figure 1:
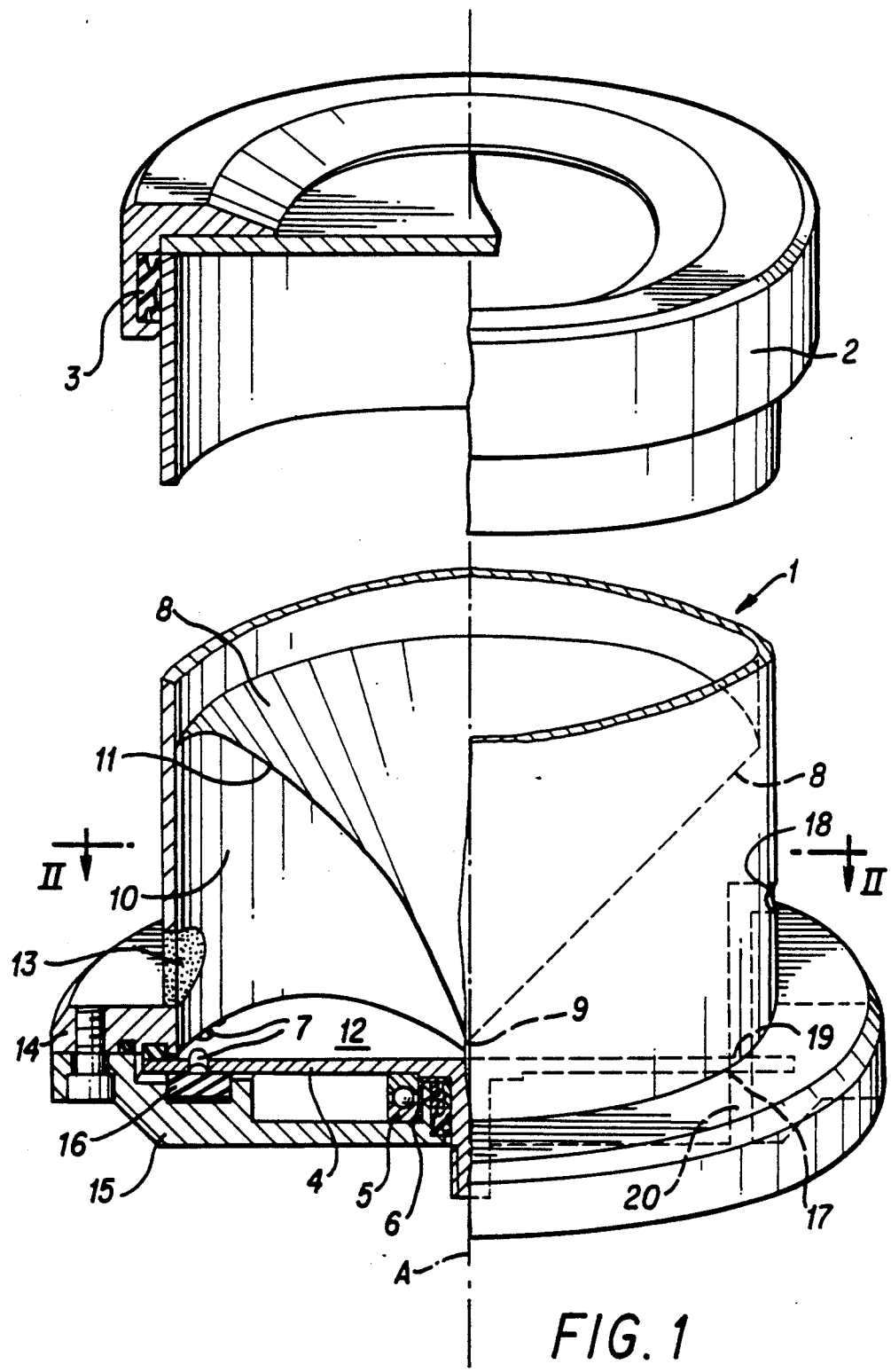
FIG. 1 shows a simplified and partially sectioned perspective view of one embodiment of the invention.
Figure 2:
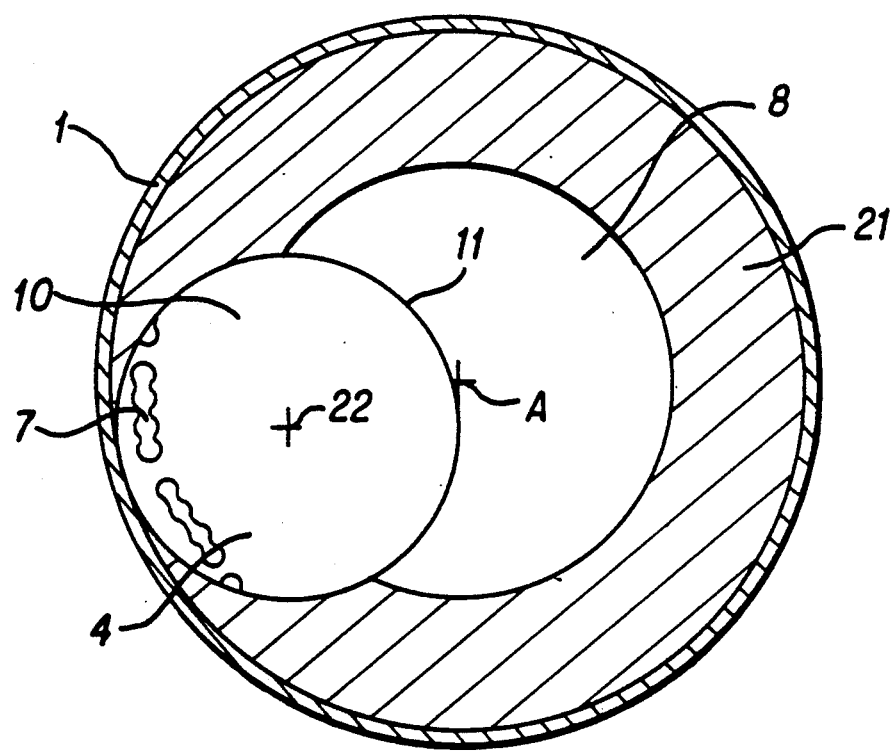
FIG. 2 shows a sectional view of the apparatus depicted in FIG. 1 taken along the line II—II in this figure.

Generally indicated at 1 in FIG. 1 is a powder container 1 defining a powder reservoir adapted to be hermetically closed by a cover 2 provided with an annular rubber gasket 3. The bottom of reservoir 1 is formed by a disc 4 mounted for rotation about a concentric axis A. To reduce friction, disc 4 is mounted on ball bearings 5 and 6. Disc 4 is formed with a concentric circular array of perforations 7. This array consists of groups of interconnected perforations separated from one another by narrow land portions as shown in FIG. 2. The type and arrangement of such perforations is known from U.S. Pat. No. 3,517,861.

Disposed in the lower portion of reservoir 1 is a downwards extending powder guide surface 8 converging towards a pointed lower end 9 practically located on the top surface of rotary disc 4 or slightly thereabove. The funnel-shaped guide surface 8 is intersected by a cylindrical well 10 having a vertically extending axis. Well 10 extends upwards from the bottom of reservoir 1 formed by rotary disc 4 to its intersection edge 11 with guide surface 8. Well 10 may in fact have any suitable cross-sectional shape, for instance a narrow and elongate configuration, an elliptical shape or, as in the example shown, a circular crosssection defining a circular bottom area 12 the diameter of which corresponds to the internal radius of reservoir 1. This circular bottom area 12 is arranged with its outermost boundary immediately adjacent the interior wall surface of reservoir 1, and with its innermost boundary intersecting central axis A.

At a location diametrally opposite central axis A, a disc 13 made of a sintered material is inserted in an opening extending through respective wall portions of well 10 and reservoir 1. This sintered disc 13 permits a gas for fluidizing the powder contained in reservoir 1 to be injected thereinto by the use of conventional means not shown in detail. The sintered disc 13 acts to diffuse the gas flow thus injected into well 10.

Reservoir 1 is formed as a cylinder provided with a flange 14 at its lower end for fixedly mounting it on a base plate 15. Embedded in base plate 15 below rotary disc 4, and in particular underneath the circular array of perforations 7, is an annular sealing gasket 16 having a single gap formed therein at a location diagrammatically indicated at 17. The location 17 of the gap is just about diametrally opposite the location whereat well 10 merges with the interior wall surface of cylindrical reservoir 1. Provided at the former location and below guide surface 8 is a supply passage 18 for a conveying gas. The open end 19 of supply passage 18 is flush with the top surface of rotary disc 4. Disposed below rotary disc 4 in alignment with open end 19 of supply passage 18 is the open end of a discharge passage 20 for the conveying gas together with a metered amount of a powder. Open end 19 of supply passage 18 and discharge passage 20 are located on the same radius with respect to central axis A as the circular array of perforations 7, so that rotation of disc 4 causes the perforations to pass between the open ends of passages 18 and 20.

As shown in FIG. 2, guide surface 8 may be formed as the surface of a solid body rather than a shaped sheet member, a sectional surface 21 of a solid body of this type being depicted in FIG. 2. As also shown in this figure, well 10 is cut from this solid body in the form of a cylinder extending parallel to central longitudinal axis A. In the present example, well 10 is of circular cross-sectional shape centered about an axis 22. The intersection of this circular-cylindrical cavity of well 10 with the guide surface results in the already mentioned intersection edge 11 shown in FIG. 1. In the embodiment shown in FIG. 2, well 10 extends between the interior wall surface of reservoir 1 and longitudinal center axis A. The bottom of well 10 is formed by disc 4 formed with drilled or punched perforations 7.

Figure 3:
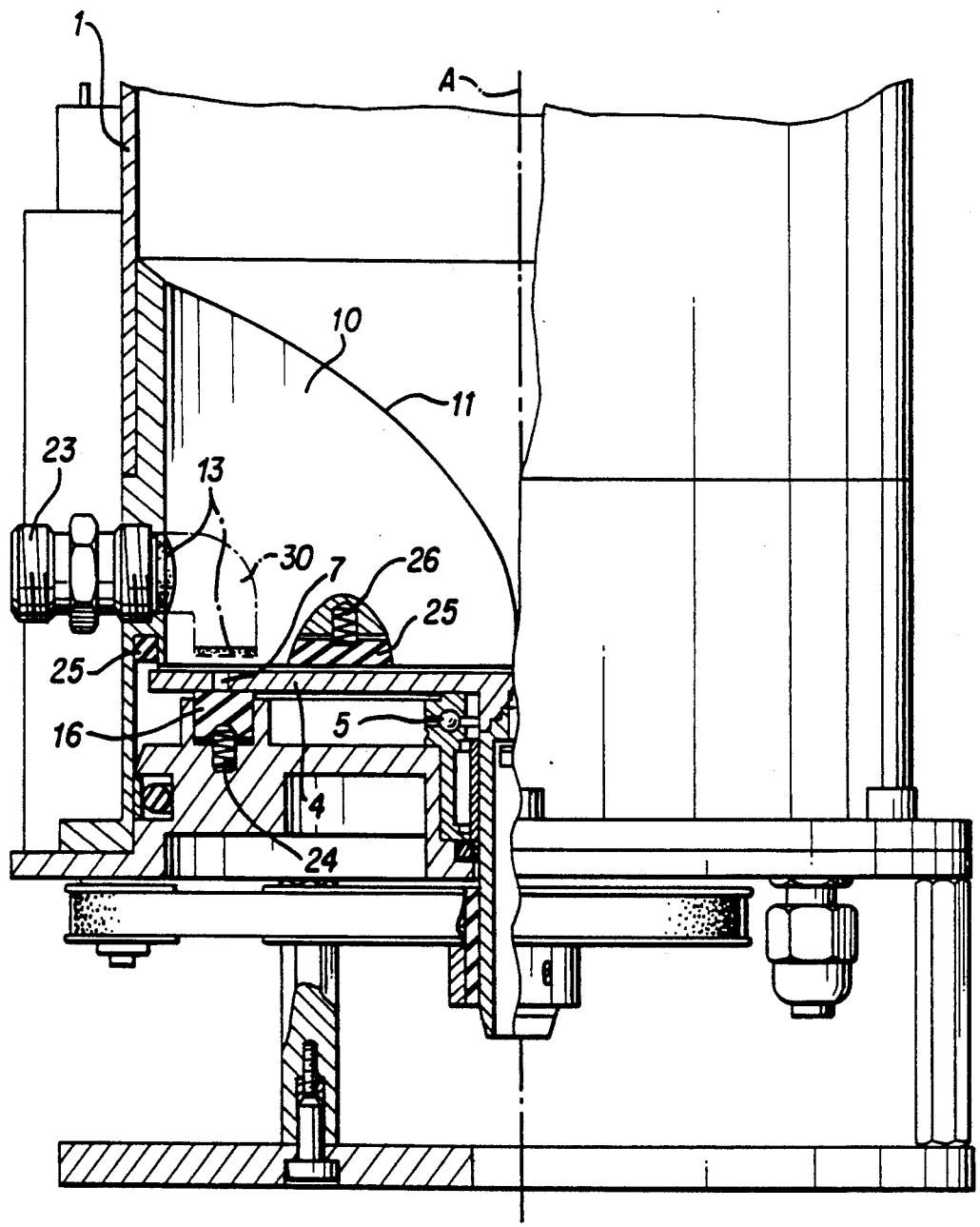
FIG. 3 shows a partially sectioned elevational sideview of a filling station.

Specific details of the construction depicted in FIG. 1 are again shown in FIG. 3, wherein identical components are designated by the same reference numerals. Connected to supply reservoir 1 is a gas supply pipe 23 having an end opening into supply reservoir 1 and provided with the already mentioned sintered disc 13. As also shown in this figure, a spring 24 is provided for urging sealing gasket 16 into engagement with the bottom surface of disc 4 at the location of perforations 7. In a similar manner, an annular sealing gasket extending along the lower end of well 10 is urged into engagement with the top surface of disc 4 by a spring element 26.

Figure 4:
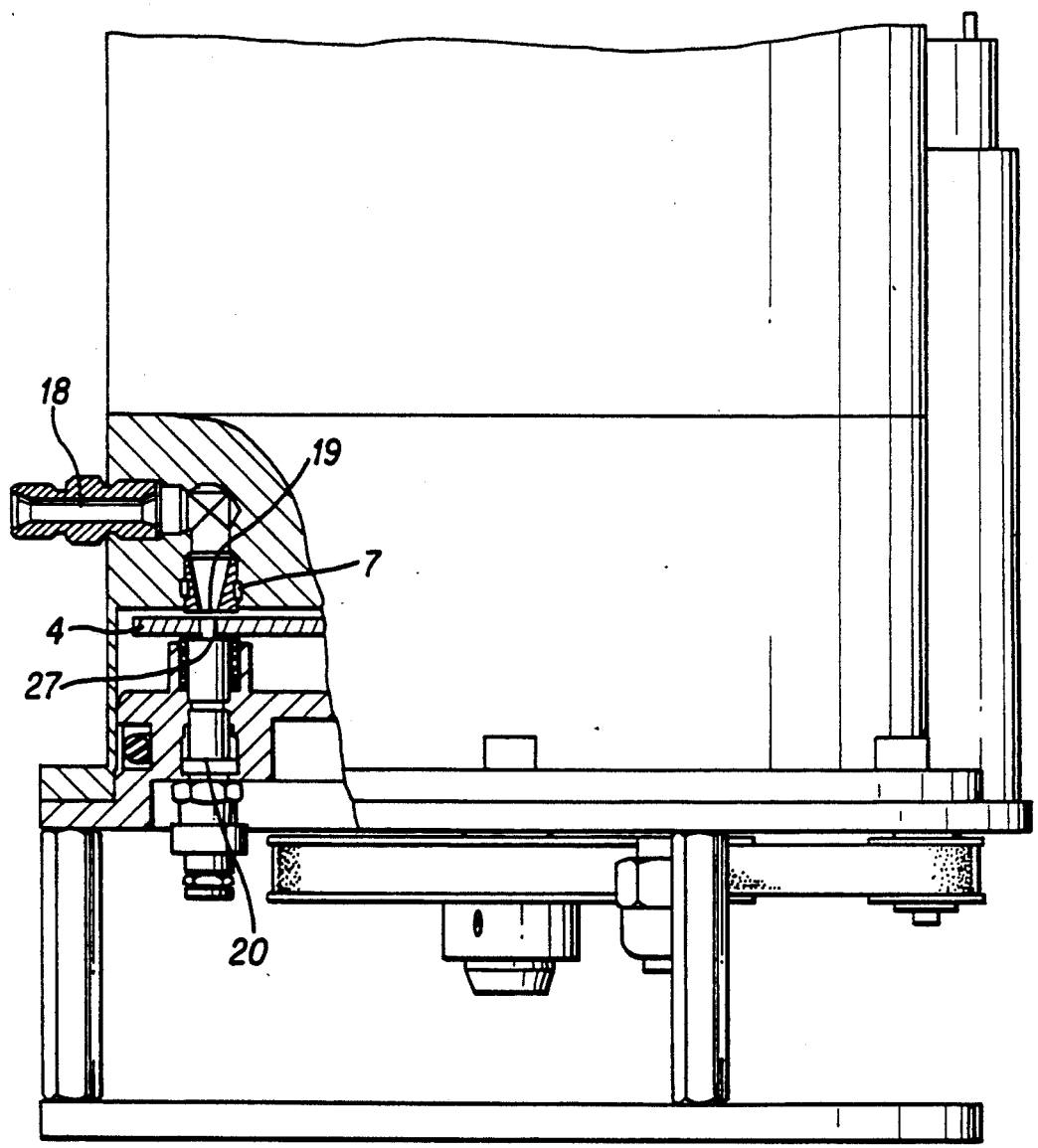
FIG. 4 shows a partially sectioned elevational sideview of a powder discharge station.

FIG. 4 shows the parts of the apparatus for introducing a powder into the carrier gas flow as already known from U.S. Pat. No. 3,517,861. The open end 19 of carrier gas supply passage 18 is located immediately above disc 4, while the open end 27 of the gas-and-powder discharge passage 20 lies immediately below disc 4. Rotation of disc 4 causes the openings 7 formed therein to successively pass through the gap between the open ends of the two passages 18 and 20.

The described apparatus operates as follows: After cover 2 has been removed, the powder to be sprayed is filled into reservoir 1, whereupon the latter is again hermetically closed with cover 2. The filling operation is preferably carried out under a protective gas atmosphere. Due to the configuration of guide surface 8 and well 10, bottom portion 12 of well 10 is always covered by the powder, even when employing only a small amount thereof. Since well 10 defines a relatively small bottom surface area, a relatively small amount of the powder is required to form a powder layer having a thickness of about 1 cm this bottom surface. The powder thus accumulated in well 10 fills the openings 7 of disc 4 as they pass underneath the well during the rotation of the disc. The sealing gasket 16 below disc 4 ensures that the openings remain filled as the disc rotates, the powder supported on the top surface of the disc being wiped off the rotating disc and retained in the well cavity by annular sealing gasket 25.

During the rotation of disc 4, the perforations 7 containing the powder arrive at the location 17, whereat the open end 19 of gas supply passage 18 is disposed above and the open end of discharge passage 20 is disposed below the disc. At this location the gas supplied via passage 18 acts to entrain the powder contained in perforations 7 and to discharge the resulting gas and powder mixture through passage 20.

Particularly for processing powders having insufficient flow characteristics it has been found useful to inject a fluidizing gas into well 10 through sintered disc 13. It has also been found that the injection of a fluidizing gas may likewise be useful in the case of powders having good flow characteristics, because it permits a continuous and accurately metered flow of the powder to be maintained when the amount of a powder to be dispensed is relatively small. This method thus permits small amounts of a powder to be dispensed for coating relatively small surfaces without leaving any greater amount of the powder in the apparatus which would then have to be discarded. This contributes to a considerable reduction of the operating costs. In the drawing, the inlet for the fluidizing gas is only shown as a circular port in the sidewall of well 10 with a circular sintered disc inserted therein. It is also possible, however, to incorporate a semi-annular or even nearly completely closed annular sintered insert in the wall of the well for the injection thereinto of a fluidizing gas.

Shown in dash-dotted lines in FIG. 3 is another solution employing a bent pipe member 30 acting as an extension of a fluidizing gas supply conduit and extending into the well. The free open end of pipe member 30 is disposed parallel to and slightly above disc 4 in alignment with perforations 7 and may be provided with a sintered metal disc 13 inserted therein.

While the invention has been described above in detail with reference to specific embodiments, various changes and modifications which fall within the spirit of the invention and scope of the appended claims will become apparent to those skilled in the art. The invention is therefore only intended to be limited by the appended claims or their equivalents.

What is claimed is:

1. An apparatus for continuously conveying a powder in a gas flow, comprising a container having a powder reservoir therein with a bottom for containing a powder, a rotatable disc mounted adjacently above said bottom and formed with perforations for receiving powder at an accurate feed rate from said reservoir, a gas supply passage and a gas-and-powder discharge passage, respective ends of said passages being disposed in alignment with said perforations at opposite sides of said disc at a location remote from said bottom, said reservoir being configured with a funnel-shaped powder guide surface converging to a point adjacent said disc and a vertical cylindrical well extending down to said disc, said well intersecting said powder guide surface and contacting said point.

2. The apparatus according to claim 1 wherein said well defines a circular surface constituting said bottom.

3. The apparatus according to claim 1, wherein a sidewall defining said well is formed with an inlet for a fluidizing gas.

4. The apparatus according to claim 3 wherein said fluidizing gas inlet is located at the side of said sidewall facing away from said point.

5. The apparatus according to claim 3 wherein said fluidizing gas inlet is disposed at a spaced location above said bottom.

6. The apparatus according to claim 3 wherein said fluidizing gas inlet is formed as a circumferential slot extending along part of said sidewall of said well.

7. The apparatus according to claim 3 wherein said fluidizing gas inlet is formed as a bent member projecting into said reservoir and having a free end opening disposed parallel to said disc and at a spaced location above said perforations.

8. The apparatus according to claim 3 wherein a disc formed of a sintered material is disposed in said fluidizing gas inlet or in said free end of said pipe member, respectively.

* * * * *